Patented Dec. 22, 1931

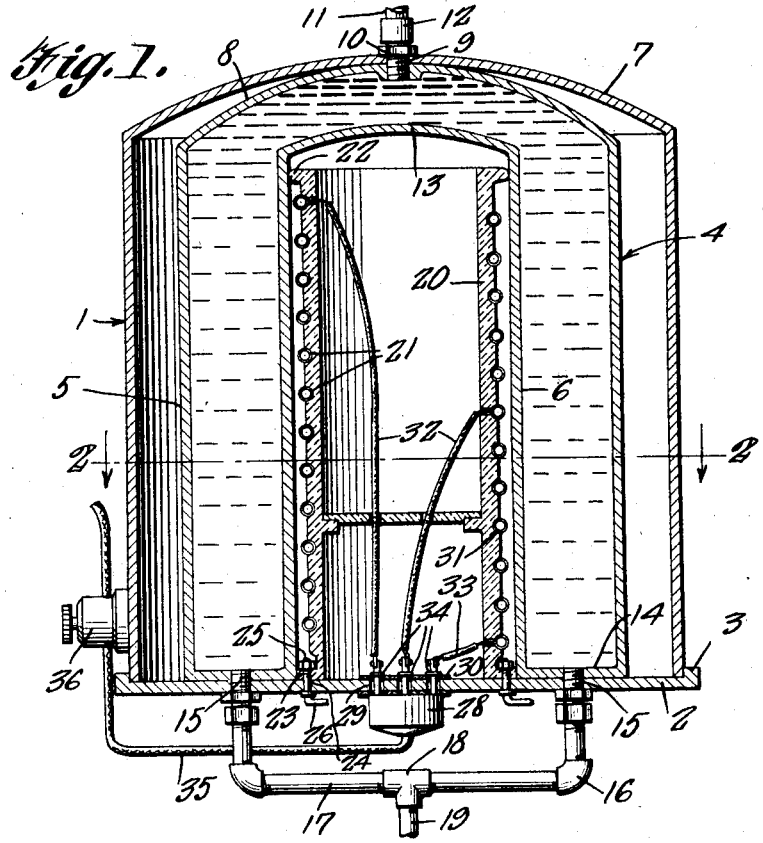

1,837,992

UNITED STATES PATENT OFFICE

PETE PALUMBO, OF WEIRTON, WEST VIRGINIA

ELECTRIC WATER HEATER

Application filed July 30, 1930. Serial No. 471,747.

This invention relates to an improvement in electric water heaters and has as its general object to provide a water heater of this type which will be capable of heating a maximum volume of water with the expenditure of a minimum amount of electric current so that the heater will be economical to use.

Another object of the invention is to provide a heater of this class, the component parts of which may be readily assembled, and readily disassembled for repairs, if necessary.

Another object of the invention is to provide a heater of this class in which the water circulating chamber will be effectually heat insulated and likewise in which the heating unit will be most effectually positioned with respect to the water circulating chamber.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a vertical diametric sectional view through the heater embodying the invention.

Figure 2 is a horizontal sectional view on the line 2—2 of Figure 1, looking in the direction indicated by the arrows.

The heater comprises an outer shell 1 which is of cylindrical form and which is mounted upon a base 2 which is preferably of circular form, the base having an upstanding circumferential shoulder upon its upper side, indicated by the numeral 3 within the bounds of which shoulder the open lower end of the shell 1 may be disposed. Arranged upon the base 2 and within the shell is the water circulating chamber which is indicated in general by the numeral 4, and this chamber comprises concentric, cylindrical outer and inner walls 5 and 6, respectively. The shell 1 is closed at its top by a shallow dome 7 and a circulating chamber is closed at its top by a shallow dome 8, and openings 9 are formed in these dome tops and are in registration with each other, and a nipple 10 is threaded into these openings and a hot water conducting pipe 11 is connected with the nipple by a coupling 12. The walls 5 and 6 of the water circulating chamber are concentric to each other and the wall 6 supports a dome 13 which is spaced with respect to the dome 8, and the bottom of this chamber is closed as indicated by the numeral 14, and pipes 15 are fitted into threaded openings in the bottom 2 of the shell 1, and the bottom 14 of the water circulating chamber. The pipes 15 are connected at their lower ends by elbows 16 with pipes 17 which are connected by a T-coupling 18, and a cold water supply pipe 19 is fitted into the down branch of this coupling.

The wall 6 of the water circulating chamber and the top 13 of this wall constitutes a housing which is located centrally within the water circulating chamber and within the housing there is arranged an electric heating unit which comprises a cylindrical body 20 of insulating material formed in its outer side with a helical groove 21, and this body is provided upon its upper side and at its upper end with an outstanding circumscribing flange 22 which marginally contacts the wall 6 so as to space the body 20 from the said wall 6. In order to space the lower portion of the body 20 from the wall 6, the body is formed upon its outer side and at its lower end, with an outstanding circumferential flange 23, and bolts 24 are fitted through registering openings in this flange and in the base 2, and nuts 25 are applied to the upper threaded ends of these bolts, the lower end portion of each bolt being turned at right angles as at 26 to provide a hand grip whereby the bolt may be tightened and a collar 27 being formed upon each bolt so as to engage against the under side of the base 2, and thus limit the upward movement of the respective bolt through the opening which is formed in said base.

A junction box 28 is arranged beneath the bottom 2 and a washer 29 of any suitable waterproof material is arranged between the open top of the box 28 and a similar washer 30 is preferably arranged upon the upper side of the base 2, and the heating unit includes an electric resistance coil 31 which is wound about the body 20 and in the helical groove 21, and conductor wires 32 are led downwardly within the body 20, one from the upper end of the wire coil, another from an intermediate portion of said coil, and a third from the lower end of the coil, and these wires are connected to conductors 34 which are fitted through openings formed in the base 2 and out of contact with the walls of said openings, but extending also through openings in the washers 29 and 30 so as to be insulated. A conductor cable 35 is led into the bottom of the box 28 and comprises conductor wires which are connected to the conductors 32 and 33. The cable 35 leads to a switch 36 which is mounted upon one side of the shell 1 and, it is by this switch that the supply of current to the heating coil is operated.

From the foregoing description of the invention it will be evident that the heater embodying the invention is an exceptionally effectual one and will prove economical in use.

What I claim is:

A heater of the class described comprising an outer substantially cylindrical shell closed at its top and open at its bottom, a base having a marginal rim embracing the open bottom of said shell, a hollow body within the shell and having a columnar center portion forming a water circulating space within the body concentrically of and entirely about said portion, the body being formed with a dome meeting the upper closed end of the shell at its center, a water inlet conduit leading to the water circulating space through the base and bottom of the body at two points thereof, means for distributing water from the water circulating space at the meeting of the shell and dome, and a variable electric heating element arranged in the columnar portion and coextensive with the same.

In testimony whereof I affix my signature.

PETE PALUMBO.